United States Patent [19]

Bilharz et al.

[11] Patent Number: 4,632,230

[45] Date of Patent: Dec. 30, 1986

[54] VALVE SYSTEM FOR A HYDRAULICALLY CONTROLLED STARTING FRICTION CLUTCH

[75] Inventors: Manfred Bilharz, Bergheim; Fritz Henken, Pulheim; Hartmut Röper, Bochum; Martin Taal, Pulheim; Peter Heider, Weilerswist; Ernst Kohl, Cologne; Dietmar Schubert, Hennef, all of Fed. Rep. of Germany

[73] Assignee: Ford Motor Company, Dearborn, Mich.

[21] Appl. No.: 698,995

[22] Filed: Feb. 7, 1985

[30] Foreign Application Priority Data

Feb. 8, 1984 [DE] Fed. Rep. of Germany ....... 3404378

[51] Int. Cl.$^4$ ..................... F16D 25/14; F16D 43/284
[52] U.S. Cl. ............... 192/0.033; 192/103 F
[58] Field of Search ............ 192/0.033, 0.076, 0.096, 192/103 F

[56] References Cited

U.S. PATENT DOCUMENTS

| | | | |
|---|---|---|---|
| 3,004,447 | 10/1961 | Sand | 192/0.076 X |
| 3,237,734 | 3/1966 | Jania | 192/0.076 X |
| 4,502,579 | 3/1985 | Makita | 192/0.076 X |
| 4,542,665 | 9/1985 | Yamamuro et al. | 192/0.076 X |

FOREIGN PATENT DOCUMENTS

| | | | |
|---|---|---|---|
| 1555318 | 2/1977 | Fed. Rep. of Germany. | |
| 535176 | 12/1976 | U.S.S.R. | 192/103 F |

Primary Examiner—Rodney H. Bonck
Attorney, Agent, or Firm—Donald J. Harrington; Keith L. Zerschling

[57] ABSTRACT

In a valve system for a hydraulically controlled starting friction clutch, a clutch pressure control valve that controls the clutch pressure during the starting phase of the clutch engagement as a function of the torque requirement of the operator, and a valve that overrides the clutch pressure control valve as a function of the output speed wherein a clutch pressure control valve 17 has a valve arrangement that acts as a slippage time limiter, the latter comprising a startup valve 13, an accumulator 14 and an on-off valve 15. After a specific time affected by the selection of the throttle orifices 28a and 28b and the piston rod diameter 27, higher clutch pressure pk (D, L, R) is fed to the clutch pressure control valve.

4 Claims, 2 Drawing Figures

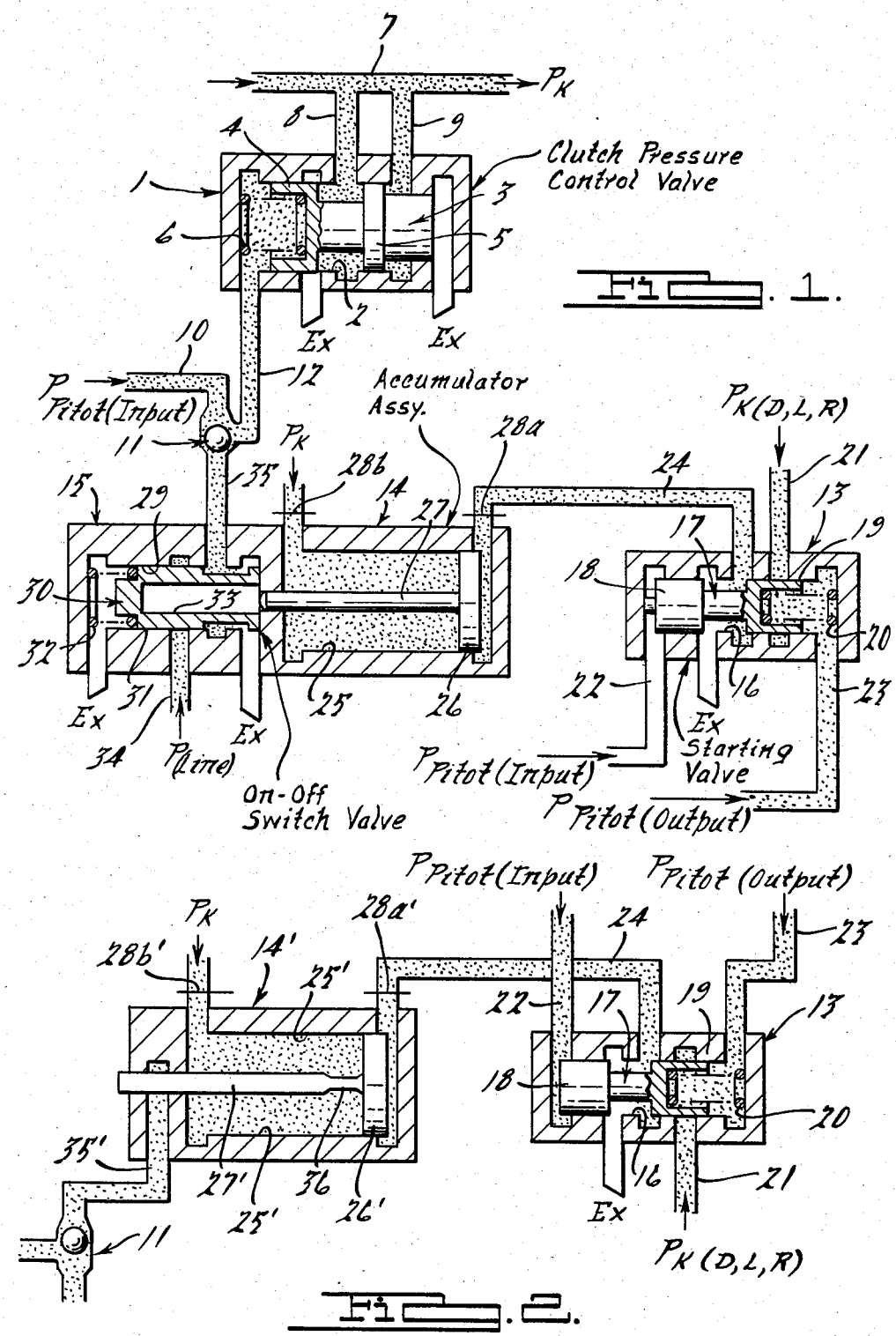

VALVE SYSTEM FOR A HYDRAULICALLY CONTROLLED STARTING FRICTION CLUTCH

Our invention relates to a valve system for a hydraulically controlled starting friction clutch for motor vehicles having an internal combustion engine.

GENERAL DESCRIPTION OF THE INVENTION

A valve system for a hydraulically controlled starting friction clutch, in particular for motor vehicles, is disclosed in German Auslegeschrift (Published Specification) No. 15 55 318. It comprises a clutch pressure control valve for controlling the clutch pressure during the starting phase as a function of the torque requirement of the driver. A valve overrides the clutch pressure control valve as a function of the driving speed.

In the valve system of the German specification the clutch pressure control valve for controlling the clutch pressure is overridden by a valve that senses the velocity of travel. The overriding action occurs when the road speed governor regulating valve on the output shaft delivers a pressure signal indicating that a predetermined travel velocity of the motor vehicle has been exceeded. The starting control that effects gentle starting operation is discontinued above a specific travel velocity to assure that adequate clutch pressure is maintained for gear ratio changes during acceleration and for low torque upshifts (i.e., with the accelerator pedal relaxed).

A disadvantage of such a prior art valve system is the possibility that during a starting procedure of the motor vehicle the torque transmitted to the driving wheels may not be sufficient to set the vehicle in motion quickly because of an insufficient torque requirement of the driver or on account of excessive starting resistance—for example, on steep slopes, while towing et cetera. Thus the starting friction clutch remains in a slippage state for a substantial period of time. This can lead to a considerable heating of the friction surfaces and eventually to the overheating and destruction of the friction clutch.

It is an object of the present invention to provide a valve system for a hydraulically controlled starting friction clutch, in particular for motor vehicles, in which there is provided a valve arrangement that acts as a slippage time limiter thereby preventing overheating of the friction clutch during a starting procedure initiated with an insufficient torque capacity.

The valve arrangement, which comprises a startup valve, an accumulator and an on-off valve, is associated with a clutch pressure control valve. The startup valve comprises a valve member with two control lands between which the clutch pressure is supplied. A pressure signal dependent upon the driving speed acts upon one end of the valve member and a pressure signal dependent upon the output speed and a spring act upon the other end. When there is a substantial speed difference between the driving speed and the output speed, the clutch pressure is fed by way of a line to an accumulator, the piston of which is moved on account of the difference in area owing to the piston rod. The stroke of the accumulator piston is delayed by throttling orifices.

The piston rod acts upon the valve member of the on-off valve. The on-off valve is moved by the piston rod from its initial position, where it blocks line pressure, to its engaging position where it conveys line pressure by way of a duct and a ball shuttle valve to the clutch pressure control valve. A slippage period limitation is thus produced for the starting friction clutch which is a function of the speed difference. This essentially avoids the heating and danger of failure of the starting friction clutch. During the predetermined startup time the speed and thus the power of the engine are sharply reduced. This on the one hand makes the driver alert to the slippage condition and on the other prevents the friction clutch from being damaged. Less frictional heat must be absorbed at a reduced speed.

DESCRIPTION OF THE DRAWINGS

The invention is described in greater detail with reference to an embodiment illustrated in the accompanying drawing in which:

FIG. 1 shows diagrammatically an embodiment of the valve system to the invention, and FIG. 2 shows a further simplified embodiment of the valve system of the invention.

PARTICULAR DESCRIPTION OF THE INVENTION

A clutch pressure control valve 1, which is a pressure regulator valve, comprises a valve member 3, which is disposed in a valve bore 2, has two control lands 4 and 5. It is acted upon at one end by a compression spring 6. A line 7 conveying line pressure from a pressure medium source to the clutch is connected to the valve bore 2 of the clutch pressure control valve 1 by way of lines 8 and 9 adjacent to the control land 5 on the valve member 3. In the present case the line pressure P (LINE) is equal to the clutch pressure Pk. A line 10 conveying a pressure signal dependent upon the input or driving speed is connected to the end of the valve bore 2 receiving the spring 6 by way of a ball shuttle valve 11 and a line 12. Exhaust ports Ex are provided adjacent the remote side of the control land 4 and adjacent the other end of the valve member 3.

The valve arrangment of the invention acts as a slippage period limiter. It comprises a startup valve 13, an accumulator 14 and an on-off valve 15, the latter acting as a switch valve. The startup valve 13 comprises a valve member 17 disposed in a valve bore 16 and having two control lands 18 and 19 and a spring 20. The valve member 17 is held by the spring 20 in a starting position in which it blocks the clutch pressure Pk (D, L, R) applied by way of a line 21 when the manual ratio selector lever, not shown, has been moved into a drive position, for example, D, L or R. The valve member 17 is acted upon at one of its ends by a pressure signal dependent upon the input or driving speed by way of a line 22 and at its other end by a pressure signal dependent upon the output speed by way of a line 23. In the region between the control lands 18 and 19 a line 24 leads by way of a throttle orifice 28a to the accumulator valve 14, and an outlet Ex is provided there.

The accumulator 14 comprises an accumulator piston element 26, which is displaceable in a valve bore 25, and piston rod 27 which is dimensioned such that there arises a desired differential area in the effective areas on the piston 26. As the piston 26 moves, the pressure medium inside the valve bore 25 of the accumulator 14 is forced through a throttle orifice 28b to which clutch pressure Pk is applied when the engine is running.

The on-off switch valve 15 comprises a valve member part 30 which is disposed in a valve bore 29. It has a control land 31, and it is acted upon by a spring 32. In addition, the valve member 30 comprises a central bore 33 in which the piston rod 27 of the accumulator 14 can initially move freely. After an almost complete piston stroke rod 27 meets the bottom of the central bore 33. It then can move the valve member 30 against the force of the spring 32. In this connection, in its initial position the control land 31 of the valve member 30 blocks line 34 which conveys line pressure P (LINE) from the pressure medium source.

The two ends of the valve bore 29 are discharged by way of exhaust ports Ex. A line 35 leads from the valve bore 29 of the on-off valve 15 to the ball shuttle valve 11.

The valve arrangement explained with respect to its schematic structure permits the following mode of operation:

MODE OF OPERATION

The clutch pressure is set by an equilibrium of forces on the clutch pressure control valve 1. If the clutch pressure exceeds its nominal value, the valve member 3 is moved to the left as viewed in FIG. 1, until the outlet Ex is partially uncovered. The member 3 then assumes a pressure balanced position as it regulates clutch pressure Pk. The level of the clutch pressure is determined by the pressure signal, which acts upon the left-hand end of the valve member 3 and which is dependent upon the driving speed, and by the force of the spring.

During normal operation the pressure signal dependent upon the driving speed acts upon the left-hand end of the valve member 3 by way of the line 10, the ball shuttle valve 11 and the line 12. During this time the connection between the line 34 conveying line pressure P (LINE) by way of the on-off valve 15 to the line 35 is blocked.

If a predetermined speed difference now occurs inside the clutch between the driving speed and the output speed, a starting procedure is initiated by means of the startup valve 13 and the accumulator 14. A shifting movement of the accumulator moves the on-off valve 15 after a specified time which can be affected by the choice of the throttle orifices 28a and 28b and the diameter of the piston 26 of the accumulator 14. The higher the engine speed set during the starting procedure, the shorter is this time.

By appropriate dimensioning of the spring 20 in the startup valve 13 and of the throttle orifice 28a at the inlet and of the throttle orifice 28b at the outlet of the accumulator 14, the slippage time limitation according to the invention can be determined in such a way that under the most widely varying operating conditions damage to the starting friction clutch is reliably prevented without a prompt intervention on the part of the driver being necessary.

FIG. 2 shows a simplified embodiment of the invention. The startup valve 13 of FIG. 2, which has the same design as described in FIG. 1, is combined with a slightly altered accumulator 14'.

The altered accumulator 14' comprises a piston 26' is displaceable in a valve bore 25'. The piston rod 27' is dimensioned so that there arises a desired differential area in the effective areas on the piston 26'. The clutch pressure Pk (D, L, R) fed through the line 24 enters the valve bore 25' of the accumulator 14' by way of a throttle orifice 28a' and then forces the pressure medium contained therein through a throttle orifice 28b' at the outlet of the valve bore 25'.

The piston rod 27' of the piston 26' of the accumulator 14' is guided through a connection chamber of the line 35', which leads to the ball shuttle valve 11. The piston rod 27' is provided adjacent to its piston 26' with overflow grooves 36 which, as soon as the piston has performed its piston stroke, form a connection between the valve bore 25' and the line 35' to the ball shuttle valve 11. In this way the clutch pressure Pk (D, L, R) present in the valve bore 25' is conveyed directly to the clutch pressure control valve.

The control land 19 of startup valve 13 is made somewhat larger than the control land 18, so that upon a change in the clutch pressure Pk (D, L, R) and the subsequent drop in the engine speed below the predetermined speed difference, the startup valve 13 still remains in its engaging position and does not begin to oscillate.

Having described preferred embodiments of our invention, what we claim and desire to secure by U.S. Letters Patent is:

1. In a control valve system for a fluid pressure operated clutch, a slip control valve circuit comprising a clutch pressure regulator valve, a startup valve, a pressure source communicating with said startup valve, an accumulator assembly comprising a movable accumulator piston element, one side of said accumulator piston element communicating with said startup valve, means for subjecting a variable clutch input speed signal to one side of said startup valve and means for subjecting the opposite side of said startup valve to a variable clutch output speed signal, a switch valve means for distributing a pressure to said regulator valve to increase the pressure level in said clutch, said startup valve responding to a calibrated difference in the magnitudes of said input speed signal and said output speed signal to distribute pressure to said accumulator assembly thereby causing said accumulator piston element to become displaced and to trigger the operation of said switch valve.

2. The combination set forth in claim 1 wherein said accumulator assembly comprises an accumulator housing having an accumulator chamber, said accumulator element separating said chamber into two variable volumes, one accumulator volume being in fluid communication with said startup valve through a throttling orifice.

3. The combination as set forth in claim 2 wherein the other side of said accumulator element communicates with said pressure source through a second throttling orifice.

4. The combination as set forth in claim 1 wherein said switch valve comprises a switch valve part on said accumulator element and a registering valve port adapted to communicate with said regulator valve, said switch valve part registering with said valve port upon movement of said accumulator element to its displaced position thereby establishing a fluid pressure distribution path from said accumulator assembly to said regulator valve.

* * * * *